US012625497B2

(12) United States Patent
Lee et al.

(10) Patent No.: US 12,625,497 B2
(45) Date of Patent: May 12, 2026

(54) PATROL SYSTEM AND METHOD THEREOF

(71) Applicants: HYUNDAI MOTOR COMPANY, Seoul (KR); KIA CORPORATION, Seoul (KR)

(72) Inventors: Seung Yong Lee, Uiwang-si (KR); Yun Sub Kim, Suwon-si (KR); Ga Hee Kim, Seoul (KR); Hwan Hee Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 319 days.

(21) Appl. No.: 18/381,871

(22) Filed: Oct. 19, 2023

(65) Prior Publication Data

US 2024/0280992 A1 Aug. 22, 2024

(30) Foreign Application Priority Data

Feb. 20, 2023 (KR) ........................ 10-2023-0022347

(51) Int. Cl.
*G05D 1/00* (2024.01)
(52) U.S. Cl.
CPC .................................. *G05D 1/0287* (2013.01)
(58) Field of Classification Search
None
See application file for complete search history.

(56) References Cited

U.S. PATENT DOCUMENTS

| | | | |
|---|---|---|---|
| 11,209,796 B2 | 12/2021 | Wang et al. | |
| 2012/0290132 A1* | 11/2012 | Kokubo | B25J 9/1666 |
| | | | 700/250 |
| 2015/0324658 A1 | 11/2015 | Zhang et al. | |
| 2016/0188977 A1 | 6/2016 | Kearns et al. | |
| 2021/0272434 A1* | 9/2021 | Hashimoto | G06V 20/10 |
| 2021/0311476 A1 | 10/2021 | Li et al. | |
| 2022/0108104 A1 | 4/2022 | Sha et al. | |
| 2022/0157137 A1* | 5/2022 | Metzler | G06V 20/52 |
| 2023/0033781 A1* | 2/2023 | Deyle | G01C 21/3453 |
| 2024/0419192 A1* | 12/2024 | Kuc | G05D 1/221 |

FOREIGN PATENT DOCUMENTS

WO 2022/173190 A1 8/2022

* cited by examiner

*Primary Examiner* — Jennifer M Anda
(74) *Attorney, Agent, or Firm* — MCDONNELL BOEHNEN HULBERT & BERGHOFF LLP

(57) ABSTRACT

A patrol system for performing a night patrol using an indoor robot includes at least one robot and a control device that controls the at least one robot. The control device performs a night patrol for a patrol target using the at least one robot, receives a request to identify an unidentified moving object from a first robot among the at least one robot during the night patrol, selects a second robot to identify the unidentified moving object among the at least one robot in response to the request, and identifies the unidentified moving object using the second robot.

18 Claims, 8 Drawing Sheets

* POI3     * POI4

410

* POI6     * POI7

420

* POI5     * POI8

* POI2     * POI1     * POI9     POI10 *

430

* POI12     POI11 *

FIG. 4

PATROL SYSTEM AND METHOD THEREOF

CROSS REFERENCE TO RELATED APPLICATIONS

This application claims the benefit of priority to Korean Patent Application No. 10-2023-0022347, filed in the Korean Intellectual Property Office on Feb. 20, 2023, the entire contents of which are incorporated herein by reference.

TECHNICAL FIELD

The present disclosure relates to a patrol system for performing a night patrol using an indoor robot and a method thereof.

BACKGROUND

Because it is assumed that an indoor robot moves bright interior, it moves to a specified location (e.g., a delivery location) using light detection and ranging (LiDAR), a depth camera, and a red green blue (RGB) camera. It is difficult to normally proceed with an indoor and outdoor patrol at night using a sensor configuration of such an indoor robot.

Thus, an RGB camera and an infrared (IR) camera are loaded into a patrol robot together. The patrol robot detects a person using an IR image to detect that an unauthorized person enters a patrol zone in no-entry time upon a night patrol and store the image by means of a control system when detecting the person.

Because the IR camera (or an IR image sensor) loaded into such a patrol robot is expensive and the image obtained by the IR camera is lower in resolution than an RGB image, an object may fail to be normally detected. Furthermore, although lighting is installed, because the light of the lighting reaches an object away from the lighting, the object distant from the lighting may not be detected.

SUMMARY

The present disclosure has been made to solve the above-mentioned problems occurring in the prior art while advantages achieved by the prior art are maintained intact.

An aspect of the present disclosure provides a patrol system for performing a night patrol using an indoor robot and a method thereof.

Another aspect of the present disclosure provides a patrol system for effectively performing an indoor and outdoor patrol at night using a plurality of indoor robots without an IR camera and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a patrol system may include at least one robot and a control device that controls the at least one robot. The control device may perform a night patrol for a patrol target using the at least one robot, may receive a request to identify an unidentified moving object from a first robot among the at least one robot during the night patrol, may select a second robot to identify the unidentified moving object among the at least one robot in response to the request, and may identify the unidentified moving object using the second robot.

The at least one robot may include a communication device, a memory, and a controller connected with the communication device and the memory. The controller may receive a patrol path transmitted from the control device through the communication device and may update a patrol path stored in the memory using the received patrol path.

The controller may receive a patrol initiation command transmitted from the control device using the communication device and may initiate patrolling of the patrol target along the patrol path stored in the memory in response to the patrol initiation command.

The controller may detect a first object from an image obtained by a camera included in the at least one robot, may determine whether the first object is a person object, may determine whether the first object is an authorized person based on appearance information of the first object in response to determining that the first object is the person object, and may transmit information indicating that there is an object which is not allowed to enter the patrol target to the control device in response to determining that the first object is not the authorized person.

The controller may continue patrolling the patrol target in response to determining that the first object is not the person object or in response to determining that the first object is the person object and is the authorized person.

The controller may detect a second object based on a point cloud generated by light detection and ranging (LiDAR), may determine whether the second object is a moving object, may identify whether the second object is within a view of a camera included in each of the at least one robot in response to determining that the second object is the moving object, and may transmit a request to identify the second object to the control device in response to identifying that the second object is out of the view of the camera.

The controller may identify whether the second object is an object detected by the camera in response to identifying that the second object is within the view of the camera, and may transmit the request to identify the second object to the control device in response to identifying that the second object is not the object detected by the camera.

The controller may continue patrolling the patrol target in response to identifying that the second object is the object detected by the camera.

The controller may continue patrolling the patrol target in response to determining that the second object is not the moving object.

The control device may select a robot to identify the unidentified moving object based on a distance from a robot which requests to identify the unidentified moving object.

The control device may correct a patrol path of the second robot and may transmit the corrected patrol path to the second robot.

According to another aspect of the present disclosure, a patrol method may include performing, by a control device, a night patrol for a patrol target using at least one robot, receiving, by the control device, a request to identify an unidentified moving object from a first robot among the at least one robot during the night patrol, selecting, by the control device, a second robot to identify the unidentified moving object among the at least one robot in response to the request, and identifying, by the control device, the unidentified moving object using the second robot.

The performing the night patrol may include transmitting, by the control device, a patrol initiation command and a patrol path to the at least one robot and initiating, by the at least one robot, to patrol the patrol target along the patrol path.

The receiving the request to identify the unidentified moving object may include detecting, by the first robot, a first object from an image obtained by a camera included in the first robot, determining, by the first robot, whether the first object is a person object, determining, by the first robot, whether the first object is an authorized person based on appearance information of the first object in response to determining that the first object is the person object, and transmitting, by the first robot, information indicating that there is an object which is not allowed to enter the patrol target to the control device in response to determining that the first object is not the authorized person.

The receiving the request to identify the unidentified moving object may further include continuing, by the first robot, patrolling the patrol target in response to determining that the first object is not the person object or in response to determining that the first object is the person object and is the authorized person.

The receiving the request to identify the unidentified moving object may include detecting, by the first robot, a second object based on a point cloud generated by LiDAR included in the first robot, determining, by the first robot, whether the second object is a moving object, identifying, by the first robot, whether the second object is within a view of a camera included in the first robot in response to determining that the second object is the moving object, and transmitting, by the first robot, a request to identify the second object to the control device in response to identifying that the second object is out of the view of the camera.

The receiving the request to identify the unidentified moving object may further include identifying, by the first robot, whether the second object is an object detected by the camera in response to identifying that the second object is within the view of the camera, and transmitting, by the first robot, the request to identify the second object to the control device in response to identifying that the second object is not the object detected by the camera.

The receiving the request to identify the unidentified moving object may further include continuing, by the first robot, patrolling the patrol target in response to determining that the second object is not the moving object or in response to identifying that the second object is an object detected by the camera.

The selecting the second robot may include selecting, by the control device, the second robot based on a distance from the first robot.

The identifying the unidentified moving object may include correcting, by the control device, a patrol path of the second robot and transmitting, by the control device, the corrected patrol path to the second robot.

BRIEF DESCRIPTION OF THE FIGURES

The above and other objects, features and advantages of the present disclosure will be more apparent from the following detailed description taken in conjunction with the accompanying drawings:

FIG. 4 is a drawing illustrating an example of distributing patrol points for each robot according to an embodiment of the present disclosure;

DETAILED DESCRIPTION

Figure 1:
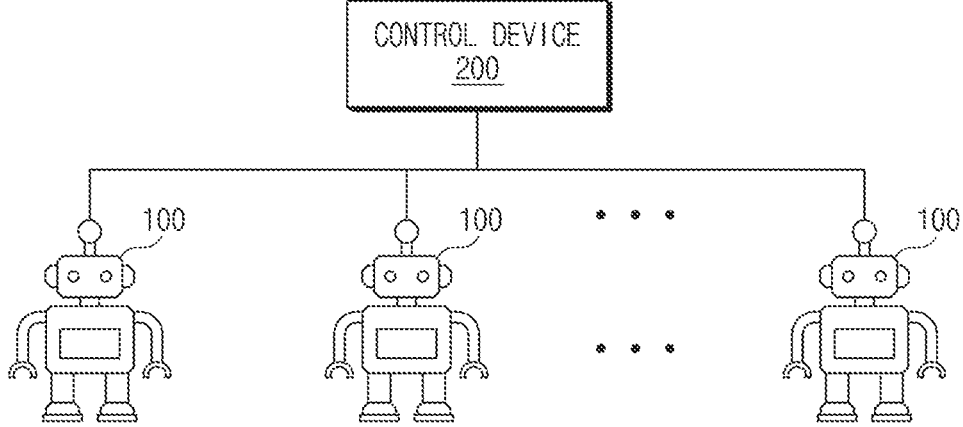
FIG. 1 is a drawing illustrating a configuration of a patrol system according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating a configuration of a patrol system according to an embodiment of the present disclosure.

Referring to FIG. 1, the patrol system may include at least one robot 100 for patrolling a determined zone (or area) and a control device 200 for managing and controlling the at least one robot 100. The at least one robot 100 and the control device 200 may be connected therebetween over a network. The network may be implemented as a wireless network such as a wireless Internet network (e.g., wireless-fidelity (Wi-Fi)), a mobile communication network, and/or a short range communication network.

The at least one robot 100 may perform a task (e.g., delivery, serving, and/or patrol) for each predetermined time zone in an indoor environment. For example, the at least one robot 100 may perform the delivery of goods in an office in the daytime and may perform an office patrol at night.

The at least one robot 100 may patrol (or scout) a predetermined zone, that is, a patrol zone under an instruction of the control device 200 in a predetermined time (e.g., at night). The at least one robot 100 may receive a patrol path (or a scout path) from the control device 200. The at least one robot 100 may patrol the determined zone along the received patrol path.

The at least one robot 100 may patrol the determined zone using a sensing device (e.g., an image sensor, a distance sensor, or the like) loaded into itself and may identify whether there is a moving object (e.g., a person) which is not allowed to enter. When there is the moving object which is not allowed to enter (or an unauthorized moving object), the at least one robot 100 may transmit a request to additionally identify the moving object to the control device 200.

When receiving the request to additionally identify the moving object from the at least one robot 100, the control device 200 may select a robot to additionally identify the moving object among the at least one robot 100. The control device 200 may correct a patrol path of the selected robot and may transmit the corrected patrol path to the selected robot 100.

As an example, when receiving the request to additionally identify the moving object which is not allowed to enter, that is, the unauthorized moving object from any one of the at least one robot 100, the control device 200 may select a robot to additionally identify the moving object (i.e., an additional identification performance robot). At this time, the control device 200 may select a robot, which is closest to a robot which requests to additionally identify the moving object (i.e., an additional identification request robot) among the remaining robots except for the additional identification request robot among the at least one robot 100, as the additional identification performance robot. The control device 200 may correct a patrol path of the selected additional identification performance robot and may transmit the corrected patrol path to the additional identification performance robot. The additional identification performance robot may move along the corrected patrol path and may identify an unauthorized moving object.

As another example, when receiving the request to additionally identify the unauthorized moving object from any one of the at least one robot 100, the control device 200 may correct a patrol path of the additional identification request robot. The control device 200 may transmit the corrected patrol path to the additional identification request robot. The additional identification request robot may update a previous patrol path to the corrected patrol path and may patrol along the corrected patrol path (i.e., the updated patrol path) to identify the unauthorized moving object.

Figure 2:
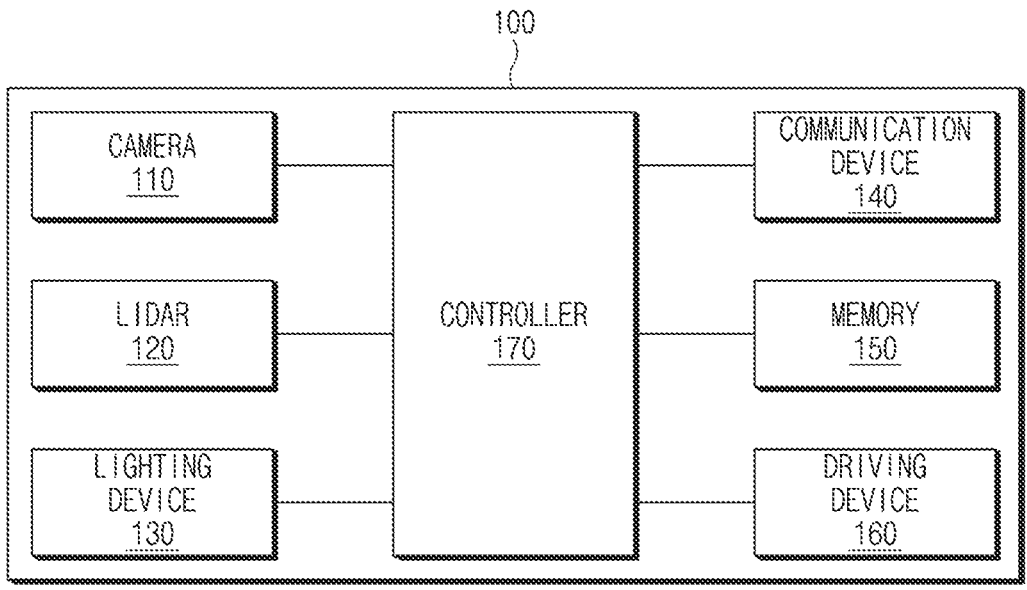
FIG. 2 is a block diagram illustrating a configuration of a robot according to an embodiment of the present disclosure.

FIG. 2 is a block diagram illustrating a configuration of a robot according to an embodiment of the present disclosure.

A robot 100 may be an indoor robot used in an indoor environment, for example, an indoor space (e.g., an office, a restaurant, or the like), a warehouse, and the like, which is capable of performing autonomous driving. Referring to FIG. 2, the robot 100 may include a camera 110, light detection and ranging (LiDAR) 120, a lighting device 130, a communication device 140, a memory 150, a driving device 160, and a controller 170.

The camera 110 may capture an image around the robot 100. The camera 110 may be fixed to the robot 100 to face a predetermined one direction. For example, the camera 110 may be installed in the robot 100 to face forward. The camera 110 may be implemented as a red, green, blue (RGB) camera.

The camera 110 may include an image sensor, a lens, and an image processor. The image processor may perform image processing, such as noise cancellation, color reproduction, file compression, image quality adjustment, and saturation adjustment, for an image (i.e., an RGB image) obtained by the image sensor. Furthermore, the camera 110 may include an actuator for adjusting a field of view (FOV), a lens angle, and/or the like.

The LiDAR 120 may be mounted together with the camera 110 on the robot 100 to face a predetermined one direction. For example, the LiDAR 120 may be installed in the robot 100 to face the front of the robot 100.

The LiDAR 120 may be a distance sensor, which may measure a distance between the robot 100 and a surrounding object. The LiDAR 120 may radiate a laser pulse to measure an arrival time of a laser pulse reflected from the surrounding object and may calculate space location coordinates of a reflection point (or a LiDAR point) to identify a distance from the surrounding object, a shape of the surrounding object, and the like. The LiDAR 120 may generate three-dimensional (3D) LiDAR point data.

The lighting device 130 may be used as simple lighting at night or in a dark space. The lighting device 130 may include at least one light emitting element for emitting light. The at least one light emitting element may include a light emitting diode (LED), a laser diode (LD), and/or the like.

The communication device 140 may support to perform communication between the robot 100 and the control device 200. The communication device 140 may communicate with an external device (e.g., the control device 200) over a wireless network, such as a wireless Internet network (e.g., wireless-fidelity (Wi-Fi)), a mobile communication network, and/or a short range communication network, and/or a wired network, such as a local area network (LAN) and/or an Ethernet. The communication device 140 may include an antenna, a communication processor, a communication circuit, a transceiver, and/or the like.

The memory 150 may store map data, a patrol path, and/or the like of a patrol zone. The memory 150 may store appearance information (e.g., a face image, a height, a body type) of a person who is allowed to enter (i.e., an authorized person). The memory 150 may include at least one of a flash memory, a hard disk, a solid state disk (SSD), web storage, or a combination thereof.

The driving device 160 may control motion of the robot 100 under an instruction of the controller 170. The driving device 160 may include an actuator (e.g., a motor) for controlling movement (or driving), rotation, and/or the like of the robot 100. For example, the driving device 160 may control a rotational speed of the motor depending on a control command of the controller 170 to adjust a driving speed of the robot 100. Furthermore, the driving device 160 may adjust the actuator depending on a control command of the controller 170 to switch a driving direction of the robot 100.

The controller 170 may be connected with the camera 110, the LiDAR 120, the lighting device 130, the communication device 140, the memory 150, and the driving device 160. The controller 170 may control the overall operation of the robot 100. The controller 170 may include a processor. The processor may include at least one of an application specific integrated circuit (ASIC), a digital signal processor (DSP), a programmable logic device (PLD), a field programmable gate array (FPGA), a central processing unit (CPU), a microcontroller, a microprocessor, or a combination thereof. The controller 170 may include a non-transitory storage medium which stores instructions executed by the processor. The non-transitory storage medium may include at least one of a random access memory (RAM), a static RAM (SRAM), a read only memory (ROM), a programmable ROM (PROM), an electrically erasable and programmable ROM (EEPROM), an erasable and programmable ROM (EPROM), or a combination thereof.

The controller 170 may control motion of the robot 100 using a simultaneous localization and mapping (SLAM) technology. The controller 170 may recognize a surrounding environment using the camera 110 and/or the LiDAR 120, may estimate a location of the robot 100, and may create a map. The controller 170 may transmit location information of the robot 100 to the control device 200 at a predetermined period. Herein, the period when the location information is transmitted may be predefined by a system designer.

The controller 170 may receive a patrol path of a previously allocated (or predetermined) patrol zone, which is transmitted from the control device 200 using the communication device 140. The controller 170 may update the previous patrol path previously stored in the memory 150 to the received patrol path.

The controller 170 may receive a patrol initiation command transmitted from the control device 200 through the communication device 140. When the patrol initiation command is received, the controller 170 may start to patrol the patrol zone based on the patrol path stored in the memory 150.

The controller 170 may identify whether there is a moving object (e.g., an intruder) which travels along the patrol path and is not allowed to enter a predetermined patrol zone. At this time, the controller 170 may detect entrance except for an authorized person using the camera 110 and/or the LiDAR 120.

The controller 170 may obtain an RGB image using the camera 110. The controller 170 may detect an object in the obtained RGB image. The controller 170 may identify whether the detected object is a person. When it is identified that the detected object is the person, the controller 170 may determine whether the person is an authorized person. The controller 170 may compare appearance information of the detected object (i.e., the person) with appearance information of the authorized person, which is stored in the memory 150, to determine whether the detected object is an authorized person (or an unauthorized person) based on the compared result.

When it is determined that the detected object is the authorized person, the controller 170 may continue patrolling the patrol zone. Meanwhile, when it is determined that the detected object is not the authorized person, the controller 170 may transmit information indicating that entrance except for the authorized person is detected to the control device 200. In other words, the controller 170 may notify the control device 200 that the entrance (or trespass) of the person who is not allowed to enter the patrol zone is detected.

The controller 170 may generate point cloud data using the LiDAR 120. The controller 170 may generate a point mapped to a point where a laser pulse radiated from the LiDAR 120 is reflected to generate the point cloud data. The controller 170 may cluster points which are present on a 3D space to generate a point cloud.

The controller 170 may detect an object in the patrol zone through the process of generating the point cloud data. The controller 170 may detect a blob, that is, an object based on the point cloud data. The controller 170 may determine whether the detected object is moving. The controller 170 may identify whether an object (i.e., a blob) detected by means of a current movement path and tracking information of the robot 100 is an object which is moving (i.e., a moving object).

When it is identified that the detected object is the moving object, the controller 170 may identify whether the detected object is within a view of the camera 110. When it is identified that the detected object is out of the view of the camera 110, the controller 170 may transmit a request to additionally identify the detected object to the control device 200.

When the detected object is within the view of the camera 110, the controller 170 may identify whether the detected object is detected as a person object from an RGB image obtained by the camera 110 by means of object box matching.

When it is determined that the detected object is the person object detected by the camera 110, the controller 170 may continue patrolling the patrol zone. Meanwhile, when it is determined that the detected object is not the person object detected by the camera 110, the controller 170 may request the control device 200 to additionally identify the detected object.

Figure 3:
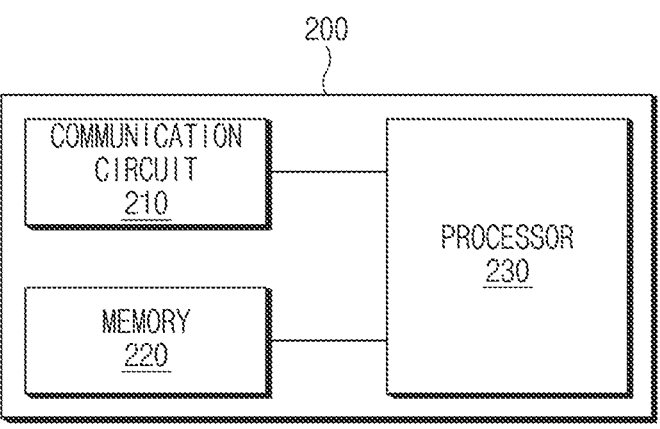
FIG. 3 is a block diagram illustrating a configuration of a control device according to an embodiment of the present disclosure.
Figure 4:
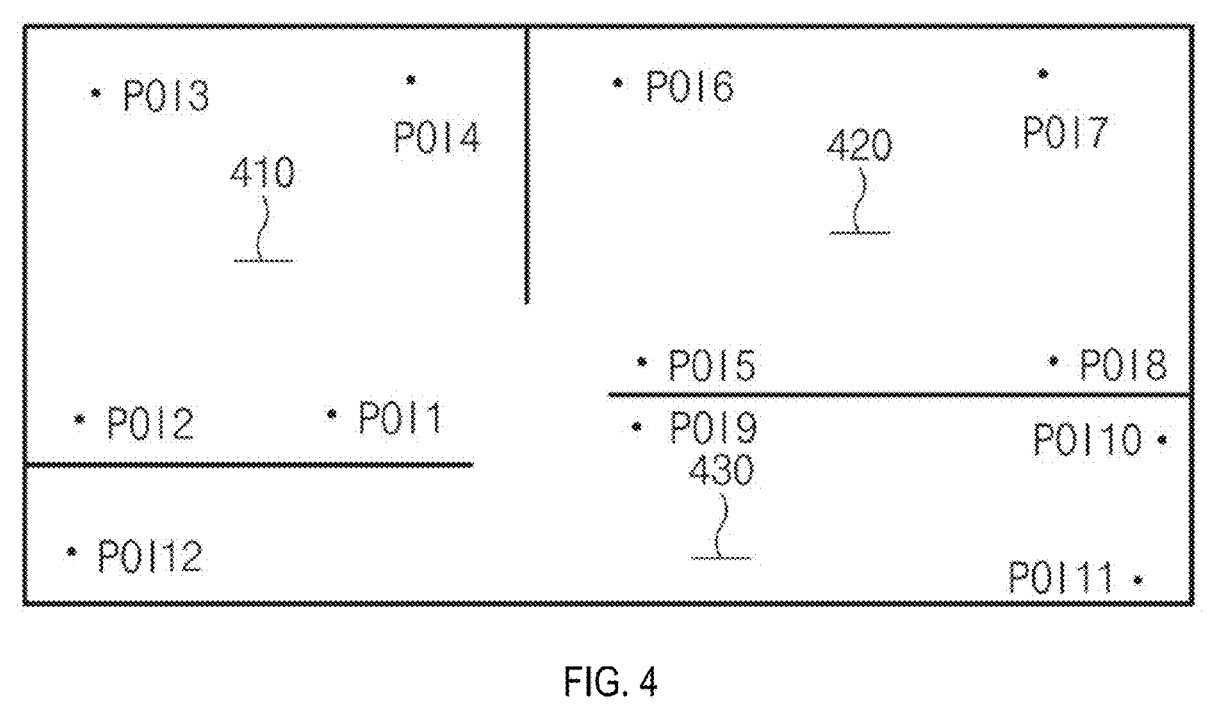

FIG. 3 is a block diagram illustrating a configuration of a control device according to an embodiment of the present disclosure. FIG. 4 is a drawing illustrating an example of distributing patrol points for each robot according to an embodiment of the present disclosure.

Referring to FIG. 3, a control device 200 may include a communication circuit 210, a memory 220, and a processor 230.

The communication circuit 210 may support the control device 200 to communicate with a robot 100 of FIG. 2. The communication circuit 210 may communicate with an external device (e.g., the robot 100) over a wireless network, such as a wireless Internet network (e.g., Wi-Fi), a mobile communication network, and/or a short range communication network, and/or a wired network, such as a LAN and/or an Ethernet.

The memory 220 may store map data for each patrol target, a patrol path for each robot, patrol point distribution information for each robot, and/or the like in a database. The patrol point refers to a point of interest (POI). The memory 220 may include at least one of a flash memory, a hard disk, an SSD, web storage, or a combination thereof.

The processor 230 may control the overall operation of the control device 200. The processor 230 may include at least one of an ASIC, a DSP, a PLD, an FPGA, a CPU, a microcontroller, a microprocessor, or a combination thereof. The processor 230 may be a non-transitory storage medium which stores instructions executed by the processor 230. The non-transitory storage medium may be located outside or inside the processor 230 and may include at least one of a RAM, an SRAM, a ROM, a PROM, an EEPROM, an EPROM, or a combination thereof.

The processor 230 may allocate (or distribute) a patrol point to the at least one robot 100 based on map data of a patrol target (e.g., an office, a restaurant, a warehouse, or the like). For example, when the patrol point, that is, a POI in the patrol target is point 12 (refer to FIG. 4), the processor 230 may allocate a POI of the patrol target on a map to each robot like Table 1 below.

TABLE 1

|  | First Robot | Second robot | Third robot |
|---|---|---|---|
| 1 | POI1 | POI5 | POI9 |
| 2 | POI2 | POI6 | POI10 |
| 3 | POI3 | POI7 | POI11 |
| 4 | POI4 | POI8 | POI12 |

The processor 230 may divide a patrol zone based on map data of the patrol target. The processor 230 may allow the robot 100 to perform a patrol for each divided patrol zone. The processor 230 may set a patrol point for each divided patrol zone. For example, the processor 230 may set a corner point in the patrol zone to a patrol point. The processor 230 may set a patrol path based on location information of the patrol point in the patrol zone. The patrol path may be a defined movement order of a patrol robot, which may include POIs arranged in an order where the patrol robot should be passed. For example, referring to FIG. 4, when there are three patrol zones, that is, a first patrol zone 410, a second patrol zone 420, and a third patrol zone 430 in a patrol target, the processor 230 may allocate a first robot, a second robot, and a third robot to the first patrol zone 410, the second patrol zone 420, and the third patrol zone 430, respectively, and may determine a patrol path of the patrol zone allocated to each robot. The processor 230 may determine a patrol path of the first robot (i.e., a patrol path of the first patrol zone 410) such that the first robot starts a patrol at POI1, passes through POI2, and ends the patrol at POI4 through POI3. The processor 230 may determine a patrol path of the second robot (i.e., a patrol path of the second patrol zone 420) such that the second robot sequentially moves POI5, POI6, POI7, and POI8 and may determine a patrol path of the third robot (i.e., a patrol path of the third patrol zone 430) such that the third robot passes through POI9, POI10, POI11, and POI12 in order.

When the patrol starts or when a predetermined patrol path update condition (or a POI update condition) is met, the processor 230 may update a patrol path (or an allocated POI) allocated to the at least one robot 100. The processor 230 may transmit patrol path information to each of the at least one robot 100 through the communication circuit 210. When receiving the patrol path information, each of the at least one robot 100 may update previous patrol path information using the received patrol path information.

The processor 230 may receive an additional identification request transmitted from the at least one robot 100 through the communication circuit 210. When the additional identification request is received, the processor 230 may determine there is an unidentified moving object in a patrol target.

The processor 230 may select a robot to perform additional identification based on location information of a robot which requests the additional identification. When the robot to perform the additional identification is selected, the processor 230 may correct a patrol path of the selected robot. The processor 230 may transmit the corrected patrol path to the selected robot.

The processor 230 may additionally identify the unidentified moving object by means of the selected robot. When the additional identification of the unidentified moving object using the selected robot is completed, the processor 230 may restore the patrol path of the selected robot.

Figure 5:
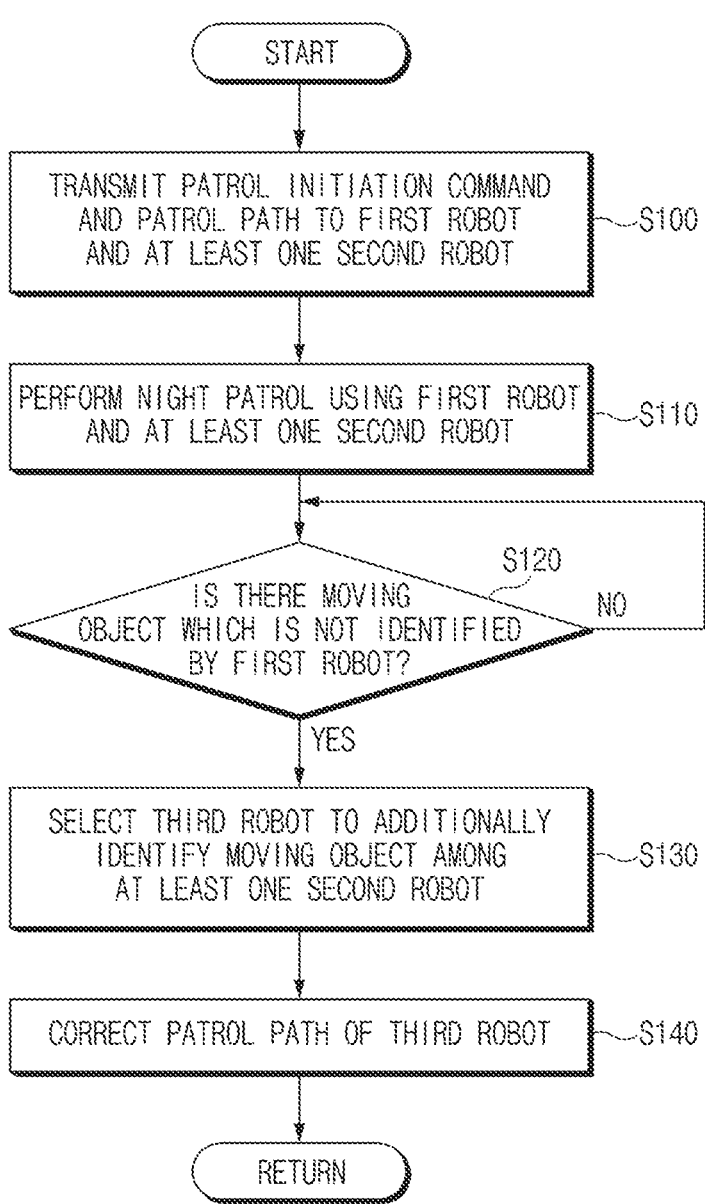
FIG. 5 is a flowchart illustrating a patrol operation method of a control device according to an embodiment of the present disclosure.

FIG. 5 is a flowchart illustrating a patrol operation method of a control device according to an embodiment of the present disclosure.

In S100, a control device 200 of FIG. 3 may transmit a patrol initiation command and a patrol path to a first robot and at least one second robot using a communication circuit 210 of FIG. 3. The control device 200 may transmit the patrol initiation command to the first robot and the at least one second robot in a predetermined patrol initiation condition (e.g., 10 p.m.). The control device 200 may transmit a patrol path for a patrol zone of the first robot to the first robot and may transmit a patrol path for a patrol zone of each of the at least one second robot to each of the at least one second robot.

In S110, the control device 200 may perform a night patrol for a patrol target using the first robot and the at least one second robot.

In S120, the control device 200 may determine whether there is a moving object which is not identified by the first robot (or an unidentified moving object) during the night patrol. When it is not identified whether the moving object is allowed to enter the patrol target, the first robot may request the control device 200 to additionally identify the moving object. When there is the request to additionally identify the moving object from the first robot, the control device 200 may determine that the moving object which is not identified by the first robot is detected.

When it is determined that there is the moving object which is not identified by the first robot, in S130, the control device 200 may select a third robot to additionally identify the moving object among the at least one second robot. The control device 200 may select the third robot based on location information of the first robot. For example, the control device 200 may select a robot, which is closest to the first robot, as the third robot to additionally identify the moving object.

In S140, the control device 200 may correct a patrol path of the selected third robot. The control device 200 may correct the patrol path of the third robot such that the third robot patrols the patrol zone of the first robot. When the correction of the patrol path of the third robot is completed, the control device 200 may transmit the corrected patrol path to the third robot. The third robot may perform a night patrol along the corrected patrol path.

Figure 6:
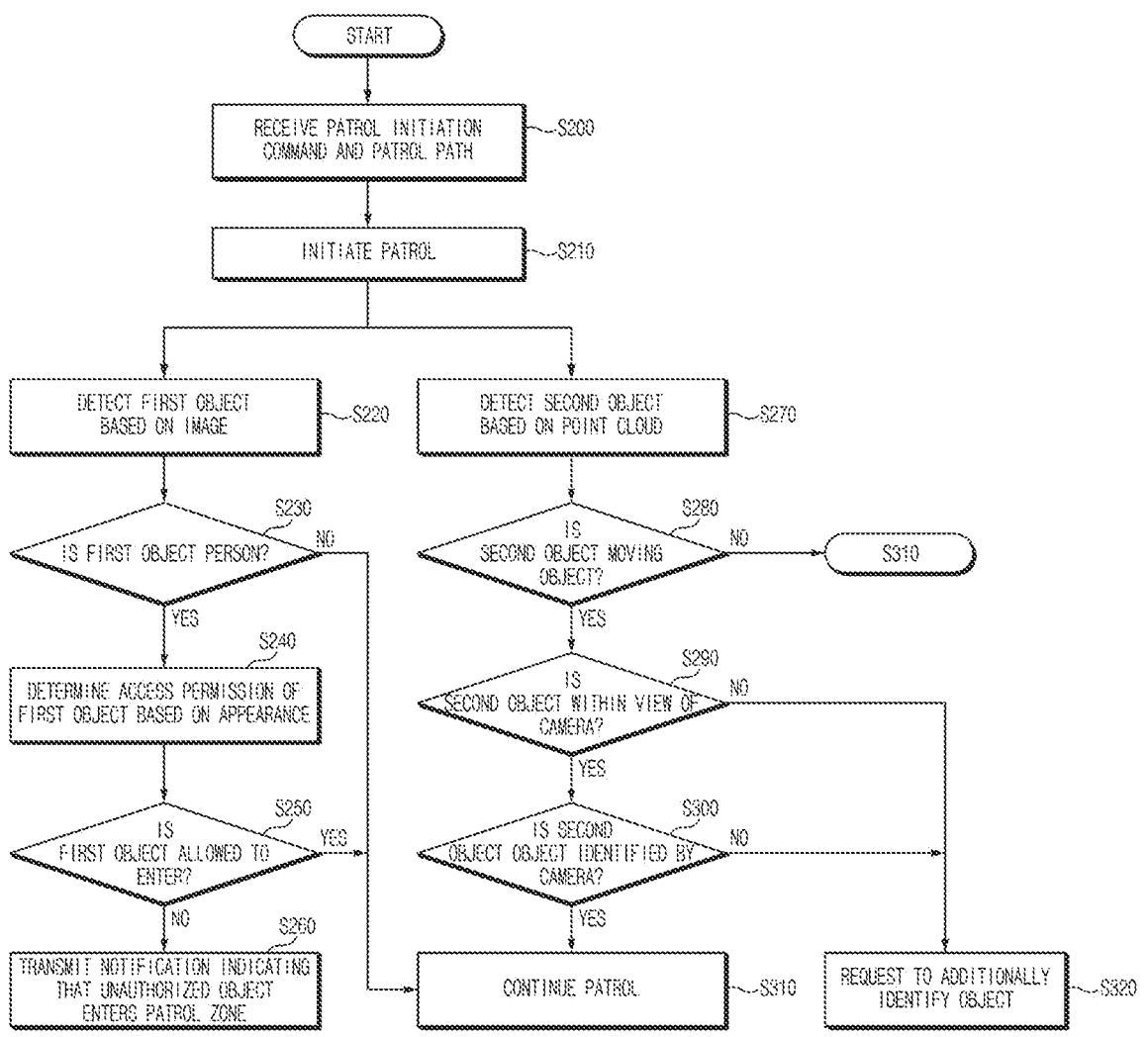
FIG. 6 is a flowchart illustrating a night patrol method of a robot according to an embodiment of the present disclosure.
Figure 7:
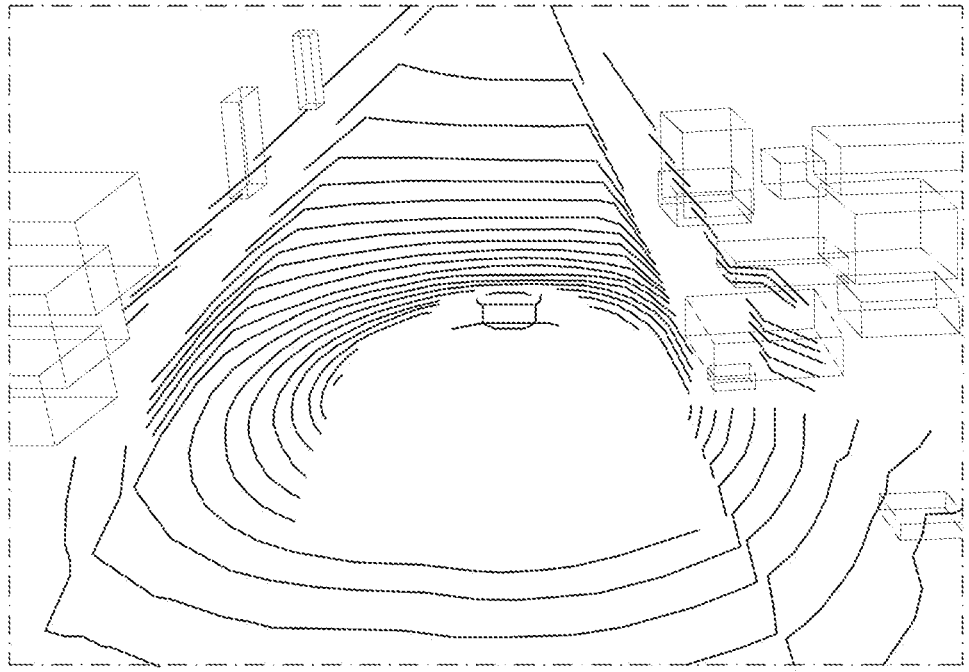
FIG. 7 is a drawing illustrating a point cloud blob according to an embodiment of the present disclosure.

FIG. 6 is a flowchart illustrating a night patrol method of a robot according to an embodiment of the present disclosure. FIG. 7 is a drawing illustrating a point cloud blob according to an embodiment of the present disclosure.

In S200, a robot 100 of FIG. 2 may receive a patrol initiation command and a patrol path transmitted from a control device 200 of FIG. 3 using a communication device 140 of FIG. 2. A controller 170 of the robot 100 may update a patrol path previously stored in a memory 150 of FIG. 2 to the patrol path received through the communication device 140. The patrol path may be defined as a column of patrol points indicating a path from a patrol start point to a patrol end point in a patrol zone allocated to the robot 100.

In S210, the robot 100 may initiate to patrol the patrol zone with reference to the patrol path depending on a patrol initiation command. The controller 170 of the robot 100 may control a driving device 160 of FIG. 2 such that the robot 100 moves along the patrol path.

In S220, the robot 100 may detect a first object based on an image obtained by a camera 110 of FIG. 2. The controller 170 of the robot 100 may operate the camera 110 at night and may also operate a lighting device 130 of FIG. 2. The controller 170 may detect the first object from the image using a deep learning technology or the like.

In S230, the robot 100 may determine whether the first object is a person.

When it is determined that the first object is the person, in S240, the robot 100 may determine access permission of the first object based on appearance information. The controller 170 of the robot 100 may compare appearance information of the first object with appearance information of an authorized person, which is previously stored in the memory 150, to determine the first object is the authorized person. When it is determined that the first object is the authorized person, the controller 170 may permit (or approve) the first object to enter the patrol zone. Meanwhile, when it is determined that the first object is an unauthorized person, the controller 170 may not permit (or approve) the first object to enter the patrol zone.

In S250, the robot 100 may identify whether the first object is allowed to enter as a result of the determination.

The controller 170 of the robot 100 may identify whether the first object is allowed to enter the patrol zone patrolled by the robot 100.

When it is identified that the first object is not allowed to enter, in S260, the robot 100 may transmit a notification indicating that the unauthorized object enters the patrol zone to the control device 200. The controller 170 of the robot 100 may transmit information indicating that the object which is not allowed to enter is present in the patrol zone to the control device 200. Furthermore, the controller 170 may request the control device 200 to additionally identify the first object which is determined as the unauthorized object.

In S270, the robot 100 may detect a second object based on a point cloud. The controller 170 of the robot 100 may generate point cloud data on a 3D space using LiDAR 120 of FIG. 2. The controller 170 may detect a blob, that is, the second object through the process of generating the point cloud data. Referring to FIG. 7, the controller 170 may detect the blob using general clustering.

In S280, the robot 100 may determine whether the second object is a moving object. The controller 170 of the robot 100 may identify whether the second object is moving using a movement path and tracking information of the robot 100. When it is identified that the second object is moving, the controller 170 may determine that the second object is the moving object.

When it is determined that the second object is the moving object, in S290, the robot 100 may determine that the second object is within a view of a camera 110 of FIG. 2. The controller 170 of the robot 100 may determine whether the moving object detected by LiDAR 120 of FIG. 2 is within the view of the camera 110.

When it is determined that the second object is within the view of the camera 110, in S300, the robot 100 may determine that the second object is an object identified by the camera 110. When the detected moving object is within the view of the camera 110, the controller 170 of the robot 100 may identify whether the moving object is a person object detected by the camera 110. When it is identified that the detected moving object is the person object detected by the camera 110, the controller 170 may identify whether the detected moving object is an authorized person of the patrol zone. When it is identified that the detected moving object is not the authorized person of the patrol zone, the controller 170 may request the control device 200 to additionally identify the moving object.

When it is determined that the first object is not the person in S230, when it is determined as the access permission of the first object in S250, when it is determined that the second object is not the moving object in S280, or when it is determined that the second object is the object identified by the camera 110 in S300, in S310, the robot 100 may continue patrolling the patrol zone.

When it is determined that the second object is not within the view of the camera 110 in S290 or when it is determined that the second object is the object which is not identified by the camera 110 in S300, in S320, the robot 100 may request the control device 200 to additionally identify the second object (or additionally identify an object).

Figure 8:
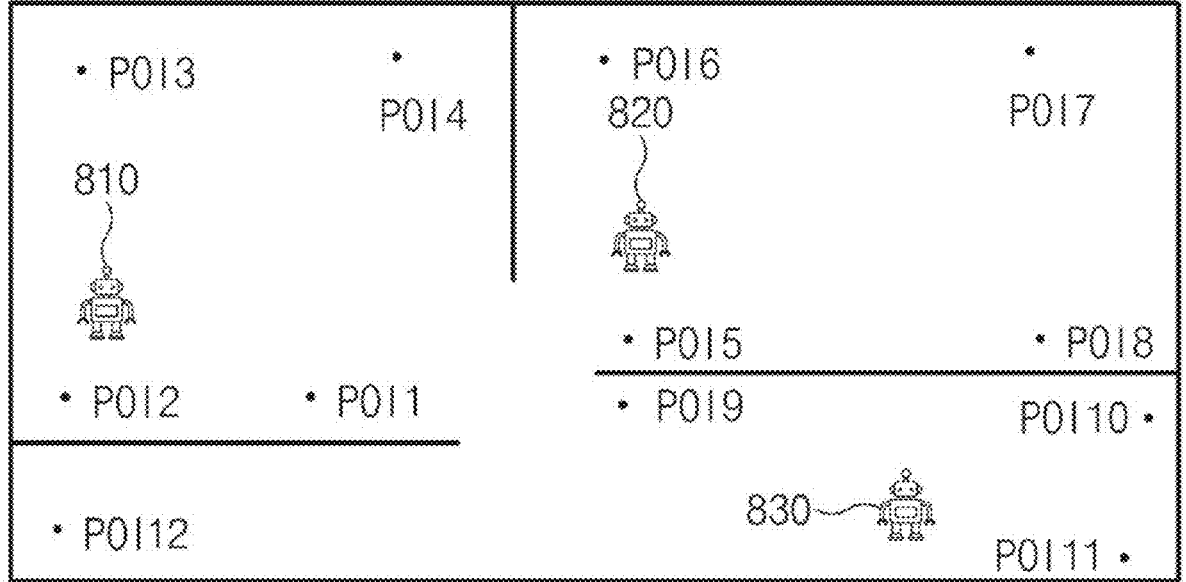
FIG. 8 is a drawing illustrating an example of allocating robots depending on a request to additionally identify a moving object according to an embodiment of the present disclosure.

FIG. 8 is a drawing illustrating an example of allocating robots depending on a request to additionally identify a moving object according to an embodiment of the present disclosure.

Referring to FIG. 8, a first robot 810 may sequentially patrol POI1, POI2, POI3, and POI4 in a first zone, a second robot 820 may sequentially patrol POI5, POI6, POI7, and POI8 in a second zone, and a third robot 830 may sequentially patrol POI9, POI10, POI11, and POI12 in a third zone.

A control device 200 of FIG. 3 may proceed with a night patrol for a patrol target using the first robot 810, the second robot 820, and the third robot 830. When a request to additionally identify a moving object is received from the first robot 810 during the night patrol, the control device 200 may calculate distances between the first robot 810 and the remaining robots 820 and 830. At this time, the control device 200 may receive pieces of location information transmitted from the first to third robots 810 to 830 and may calculate distances using the pieces of received location information. The control device 200 may select a robot with the shortest distance from the first robot 810, that is, the second robot 820 as a robot to additionally identify the moving object. The control device 200 may correct a patrol path of the robot selected as the robot to additionally identify the moving object, that is, the second robot 820 like Table 2 below.

TABLE 2

|   | First Robot | Second Robot | Third Robot |
|---|---|---|---|
| 1 | POI1 | POI5 | POI9 |
| 2 | POI2 | POI1 | POI10 |
| 3 | POI3 | POI2 | POI11 |
| 4 | POI4 | POI3 | POI12 |
| 5 |   | POI4 |   |
| 6 |   | POI6 |   |
| 7 |   | POI7 |   |
| 8 |   | POI8 |   |

The control device 200 may transmit the corrected patrol path to the second robot 820. The second robot 820 may patrol POI1, POI2, POI3, and POI4 in order rather than POI6 after POI5 along the corrected patrol path and may sequentially patrol POI6, POI7, and POI8.

As such, when there is a moving object detected by LiDAR 120 loaded into a robot 100 of FIG. 2, but when it is unable to identify the moving object using a camera 110 loaded into the robot 100, the control device 200 may identify an unidentified moving object using another robot.

Embodiments of the present disclosure may perform a night patrol using an indoor robot without using an infrared (IR) camera with a high price.

Furthermore, embodiments of the present disclosure may detect an object at a camera blind spot using a plurality of indoor robots and may efficiently perform an indoor and outdoor patrol at night.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

The invention claimed is:
1. A patrol system, comprising:
  at least one robot; and a control device configured to control the at least one robot;

wherein the control device is configured to:

perform a night patrol for a patrol target using the at least one robot;

receive a request to identify an unidentified moving object from a first robot among the at least one robot during the night patrol;

select a second robot to identify the unidentified moving object among the at least one robot in response to the request; and identify the unidentified moving object using the second robot;

wherein the at least one robot includes a controller, and wherein the controller is configured to:

detect a second object based on a point cloud generated by light detection and ranging (LiDAR);

determine whether the second object is a moving object;

identify whether the second object is within a view of a camera included in each of the at least one robot in response to determining that the second object is the moving object; and transmit the request to identify the unidentified moving object to the control device in response to identifying that the second object is out of the view of the camera.

2. The patrol system of claim 1, wherein the at least one robot further includes:

a communication device connected to the controller;

a memory connected to the controller; and wherein the controller is further configured to:

receive a patrol path transmitted from the control device through the communication device; and update the patrol path stored in the memory using the received patrol path.

3. The patrol system of claim 2, wherein the controller is further configured to:

receive a patrol initiation command transmitted from the control device using the communication device; and initiate patrolling of the patrol target along the patrol path stored in the memory in response to the patrol initiation command.

4. The patrol system of claim 2, wherein the controller is further configured to:

detect a first object from an image obtained by a camera included in the at least one robot;

determine whether the first object is a person object;

determine whether the first object is an authorized person based on appearance information of the first object in response to determining that the first object is the person object; and transmit the request to identify the unidentified moving object to the control device in response to determining that the first object is not the authorized person.

5. The patrol system of claim 4, wherein the controller is further configured to:

continue patrolling the patrol target in response to determining that the first object is not the person object or in response to determining that the first object is the person object and is the authorized person.

6. The patrol system of claim 1, wherein the controller is further configured to:

identify whether the second object is detected by the camera in response to identifying that the second object is within the view of the camera; and transmit the request to identify the second object to the control device in response to identifying that the second object is not detected by the camera.

7. The patrol system of claim 6, wherein the controller is further configured to:

continue patrolling the patrol target in response to identifying that the second object is detected by the camera.

8. The patrol system of claim 1, wherein the controller is further configured to:

continue patrolling the patrol target in response to identifying that the second object is not the moving object.

9. The patrol system of claim 1, wherein the control device is further configured to:

select the second robot based on a distance from the first robot.

10. The patrol system of claim 1, wherein the control device is further configured to:

correct a patrol path of the second robot; and transmit the corrected patrol path to the second robot.

11. A patrol method, comprising:

performing, by a control device, a night patrol for a patrol target using at least one robot;

receiving, by the control device, a request to identify an unidentified moving object from a first robot among the at least one robot during the night patrol;

selecting, by the control device, a second robot to identify the unidentified moving object among the at least one robot in response to the request; and identifying, by the control device, the unidentified moving object using the second robot; and wherein receiving the request to identify the unidentified moving object includes:

detecting, by the first robot, a second object based on a point cloud generated by LiDAR included in the first robot;

determining, by the first robot, whether the second object is a moving object;

identifying, by the first robot, whether the second object is within a view of a camera included in the first robot in response to determining that the second object is the moving object; and transmitting, by the first robot, the request to identify the unidentified moving object to the control device, when it is identified that the second object is out of the view of the camera.

12. The patrol method of claim 11, wherein performing the night patrol includes:

transmitting, by the control device, a patrol initiation command and a patrol path to the at least one robot; and initiating, by the at least one robot, to patrol the patrol target along the patrol path.

13. The patrol method of claim 11, wherein receiving the request to identify the unidentified moving object includes:

detecting, by the first robot, a first object from an image obtained by a camera included in the first robot;

determining, by the first robot, whether the first object is a person object;

determining, by the first robot, whether the first object is an authorized person based on appearance information of the first object in response to determining that the first object is the person object; and transmitting, by the first robot, the request to identify the unidentified moving object to the control device in response to determining that the first object is not the authorized person.

14. The patrol method of claim 13, further comprising:

continuing, by the first robot, patrolling the patrol target in response to determining that the first object is not the person object or in response to determining that the first object is the person object and is the authorized person.

15. The patrol method of claim 11, further comprising:

identifying, by the first robot, whether the second object is detected by the camera in response to identifying that the second object is within the view of the camera; and transmitting, by the first robot, the request to identify the unidentified moving object to the control device in response to identifying that the second object is not detected by the camera.

16. The patrol method of claim 15, further comprising:

continuing, by the first robot, patrolling the patrol target in response to determining that the second object is not the moving object or in response to identifying that the second object is detected by the camera.

17. The patrol method of claim 11, wherein selecting the second robot includes:

selecting, by the control device, the second robot based on a distance from the first robot.

18. The patrol method of claim 11, wherein identifying the unidentified moving object includes:

correcting, by the control device, a patrol path of the second robot; and transmitting, by the control device, the corrected patrol path to the second robot.

\* \* \* \* \*